United States Patent
Krause

(10) Patent No.: US 10,464,623 B2
(45) Date of Patent: Nov. 5, 2019

(54) BICYCLE SEAT AND METHOD FOR PRODUCING A BICYCLE SADDLE

(71) Applicant: Ergon International GmbH, Koblenz (DE)

(72) Inventor: Andreas Krause, Koblenz (DE)

(73) Assignee: ERGON INTERNATIONAL GMBH, Koblenz (DE)

( * ) Notice: Subject to any disclaimer, the term of this patent is extended or adjusted under 35 U.S.C. 154(b) by 62 days.

(21) Appl. No.: 15/754,457

(22) PCT Filed: Aug. 24, 2016

(86) PCT No.: PCT/EP2016/069970
§ 371 (c)(1),
(2) Date: Feb. 22, 2018

(87) PCT Pub. No.: WO2017/032796
PCT Pub. Date: Mar. 2, 2017

(65) Prior Publication Data
US 2018/0244332 A1    Aug. 30, 2018

(30) Foreign Application Priority Data
Aug. 25, 2015    (DE) .................... 20 2015 005 873 U

(51) Int. Cl.
| | |
|---|---|
| *B62J 1/26* | (2006.01) |
| *B62J 1/00* | (2006.01) |
| *B62J 1/08* | (2006.01) |
| *B62J 1/18* | (2006.01) |

(52) U.S. Cl.
CPC . *B62J 1/26* (2013.01); *B62J 1/00* (2013.01); *B62J 1/08* (2013.01); *B62J 1/18* (2013.01)

(58) Field of Classification Search
None
See application file for complete search history.

(56) References Cited

U.S. PATENT DOCUMENTS

| | | | | |
|---|---|---|---|---|
| 3,622,200 A | * | 11/1971 | Bird | B62J 1/00 297/195.1 |
| 3,834,046 A | * | 9/1974 | Fowler | A43B 13/181 36/28 |
| 4,999,068 A | | 3/1991 | Chiarella | |
| 5,240,268 A | * | 8/1993 | Allsop | B62J 1/04 280/220 |

(Continued)

FOREIGN PATENT DOCUMENTS

| | | |
|---|---|---|
| DE | 20109883 U1 | 10/2002 |
| DE | 202008018006 U1 | 5/2011 |

(Continued)

OTHER PUBLICATIONS

International Search Report dated Dec. 2, 2016 for PCT application No. PCT/EP2016/069970.

*Primary Examiner* — David E Allred
(74) *Attorney, Agent, or Firm* — Ohlandt, Greeley, Ruggiero & Perle, LLP

(57) ABSTRACT

A bicycle saddle comprises a saddle shell. A seat cushion is arranged on an upper side of the saddle shell. A support element that is connected to a saddle frame is also provided. An elastomer body is arranged between the saddle shell and the support element in order to decouple the saddle shell from the support element.

36 Claims, 2 Drawing Sheets

(56) References Cited

U.S. PATENT DOCUMENTS

| | | | | |
|---|---|---|---|---|
| 5,549,353 | A * | 8/1996 | Gaudet | B60N 2/2824 |
| | | | | 297/182 |
| 10,292,366 | B2 * | 5/2019 | Stone | A01K 15/025 |
| 2004/0051352 | A1 * | 3/2004 | Bigolin | B62J 1/26 |
| | | | | 297/214 |
| 2007/0273184 | A1 * | 11/2007 | Garneau | B62J 1/00 |
| | | | | 297/195.1 |
| 2008/0306609 | A1 * | 12/2008 | Lee | A61B 17/72 |
| | | | | 623/23.58 |
| 2009/0189421 | A1 * | 7/2009 | Yu | B62J 1/00 |
| | | | | 297/195.1 |
| 2010/0019553 | A1 | 1/2010 | Yu | |
| 2012/0001373 | A1 * | 1/2012 | McLaughlin | F16F 1/403 |
| | | | | 267/141.1 |
| 2017/0203549 | A1 * | 7/2017 | Garrison | B32B 7/05 |

FOREIGN PATENT DOCUMENTS

| | | | |
|---|---|---|---|
| EP | 0903321 | A2 | 3/1999 |
| EP | 1174458 | A1 | 1/2002 |
| EP | 1174459 | A1 | 1/2002 |
| EP | 0692510 | B1 | 12/2004 |
| EP | 2085302 | A2 | 8/2009 |
| WO | 2000044821 | A1 | 8/2000 |
| WO | 2002055366 | A1 | 7/2002 |
| WO | 2009093124 | A1 | 7/2009 |

* cited by examiner

BICYCLE SEAT AND METHOD FOR PRODUCING A BICYCLE SADDLE

BACKGROUND

1. Field of the Disclosure

The disclosure relates to a bicycle saddle and to a method for producing a bicycle saddle.

2. Discussion of the Background Art

Bicycle saddles are connected to a saddle support via a saddle frame arranged on a lower side of a saddle shell. A saddle cushion for damping is arranged on the upper side of the saddle shell. The saddle cushion is normally covered or overstretched by a cover layer or cover. There are a wide variety of different designs for bicycle saddles for improving comfort. For instance, gel pads are arranged inside the seat cushion for improving comfort. Also known is providing damping elements, for example between the saddle frame and the saddle shell, especially in the region of the saddle back. Many types of bicycle saddles frequently suffer from the drawback that comfort is relatively poor and/or the saddles are heavy.

The object of the disclosure is to create a bicycle saddle and/or a method for producing a bicycle saddle having good comfort properties.

SUMMARY

The bicycle saddle has a saddle shell. The latter is preferably produced from a hard plastic. A seat cushion may be connected to the upper side of the saddle shell, and may be covered by a cover layer. The seat cushion may furthermore have different hardness regions, e.g. different thickness and/or recesses. In addition, the seat cushion, in particular parts thereof, may be produced from different materials. According to the disclosure, the bicycle saddle furthermore has a support element. The support element connects to a saddle frame. The saddle frame connects to a seat post. Where necessary, the seat post may also be connected directly to the support element. It is furthermore possible for the saddle frame to be embodied as a connecting element between the seat post and the support element or to act as a connecting element.

According to the disclosure, an elastomer body is arranged between the support element, which is also preferably made of a relatively rigid material, especially plastic, and the saddle shell. This results the saddle shell bearing the seat cushion being decoupled from the support element, which is essentially rigidly connected to the seat post. This makes it in particular possible to tilt the saddle shell sideways in the direction of travel or to tilt the saddle shell about its longitudinal axis, which is oriented in the direction of travel. This increases comfort during pedaling, since the saddle shell also follows the pelvic movements of the user, at least to some extent, or moves synchronously with the user's pelvis. This in particular evens out the distribution of pressure during pedaling. In particular, it is also possible to compensate asymmetry in the body of the user, such as for instance a shorter leg or misalignment of the hips, using a saddle constructed according to the disclosure. This happens automatically based on the movability of the saddle shell relative to the support element. Because of this, stresses and pressure points are prevented that occur in particular during use if the body is asymmetrical.

In the bicycle saddle according to the disclosure, seat comfort is preferably adjustable using the seat cushion. This may occur in particular using the selection of the cushion material and/or the geometric design of the cushion. Thus, different regions may be produced from preferably different materials. The material may also be compressed differently in different regions, for instance, so that different cushion zones are created. In addition, recesses and the like may be arranged in the saddle cushion for improving seat comfort. Moreover, because the elastomer body is provided between the saddle shell and the support element, there is damping and it is possible to tilt the saddle shell about the longitudinal axis.

The elastomer body is preferably elastically deformable so that a relative movement between the support element and the saddle shell is permitted. It is in particular possible to provide elastomer bodies made of different materials for designing saddles with different comfort properties. The use of foams, such as PU foams, is preferred. Closed pore foams are especially preferred. The elastomer body has in particular TPU (thermoplastic polyurethane) and is particularly preferably produced from this material. Particularly suitable for this is the material produced by BASF under the "Infinergy" product name. Methods for producing TPU are described in EP 692 510, WO 00/44821, EP 11 74 459 and EP 11 74 458, for instance. It is furthermore preferred that the etastomer body is produced from EVA (ethylene vinyl acetate) or has EVA. Furthermore, EPP (expanded polypropylene), TPE (thermoplastic elastomers), and EPE (expanded polyethylene) may be used as materials. A combination of these two materials with one another or a combination of the materials with other materials is also possible. This permits different damping movement properties to be attained in the elastomer body. It is also possible to use greater compression on said materials in different regions in order to influence the damping and movement properties.

The elastomer body an elasticity modulus of 0.1 to 10 MPa, in particular 0.1 to 5 MPa, and particularly preferred 0.1 to 1.0 MPa, especially in a seat region of the saddle. The particularly preferred Infinergy E-TPU material has an elasticity modulus of 0.1 to 0.5 MPa. TPE in particular is also a suitable material (E modulus: 1.0 to 2.0 MPa).

The rebound behavior of the elastomer body is preferably in the range of preferably greater than 30%, especially greater than 40%, and particularly preferably greater than 50%.

It is particularly preferred that support element and saddle shell are connected to one another exclusively via the elastomer body in order to attain good decoupling of support element and saddle shell. A possibly additionally provided connection is preferably selected such that it does not negatively affect, or only slightly negatively affects, the decoupling and damping properties. If a connection is to be provided between saddle shell and support element, it is furthermore preferred to provide said connection in the region of a saddle nose so that the decoupling is further assured in the region of a saddle back or of a seat region of the saddle. According to the disclosure, the decoupling is especially advantageous in this region because this makes it possible to tilt the saddle, especially in this region, about its longitudinal axis to compensate pelvic movements.

The support element and/or the saddle shell are preferably produced from more rigid material than the elastomer body. The use of plastic that may where necessary be fiber-reinforced is preferred for producing the support element and/or the saddle shell. The support element and/or the saddle shell preferably have PP, PA6, or PA12 or are produced from these materials. The elasticity modulus of the support element and of the saddle shell is preferably in the range of 1000 to 10000 MPa, preferably 2500 to 6.000 MPa, and particularly preferably in the region of 3000 to 5000 MPa. The use of PP is preferred (E modulus: 1100 to 1450 MPa), PP GF20 (E modulus: approx. 2900 MPa), and/or PA6 GF15 (E modulus: 4500 to 6500 MPa).

In a preferred embodiment, the saddle frame is connected to the support element in that the saddle frame, in particular a forward connecting element of the saddle frame, is connected to the saddle nose, that is, to a region of the saddle oriented forward in the direction of travel. It is moreover preferred that the saddle frame, in particular a rear connecting element of the saddle frame, is connected to a saddle back, that is, a back of the support element oriented opposing the direction of travel. The saddle frame moreover preferably has two rails. The latter may be jointly connected to the support element in the forward region. Where necessary, the two saddle rails also merge in the forward region before connecting to the support element. The connection in the region of the saddle back is made with two rails that are preferably separated. In this case, the rear connecting element has two separate connecting parts.

Connecting the saddle frame to the support element in the region of the front and back of the saddle improves comfort, since elastic deformation of the saddle is permitted between the two connecting regions. Even if this is lower than the possible deformation of the elastomer body due to the greater rigidity of the support element, it is preferred that the support element is produced from a material that permits elastic deformation with a conventional load while riding the bicycle so that comfort is further enhanced.

The support element preferably extends from the region of the saddle nose to the region of the saddle back and in particular represents a connection between the forward receiving element and rear receiving element of the saddle frame. Where necessary the saddle frame may also be connected to the saddle shell in the region of the saddle nose. This is in particular the case if no support element is provided in the region of the seat post. The end of the support element that is forward in the direction of travel may then be connected to the saddle shell or via an intermediate element to the saddle shell, for example.

It is particularly preferred that the support element is embodied in one piece. It is furthermore preferred that the support element extends longitudinally across the entire length of the saddle, and in particular is connected to the saddle frame both at the saddle back and at the saddle nose. Similar to a saddle shell, the support element may in particular have regions having different elasticities. This may be attained by using different materials and/or different material thicknesses. Because of this, in particular the elasticity or resilience of the support element may be adjusted to the desired comfort. In particular bending of the support element about an axis transverse to the longitude of the saddle may be varied in this way.

In one particularly preferred embodiment of the disclosure, the elastomer body extends completely across a seat region of the bicycle saddle. The seat region of the bicycle saddle is the widened region of the saddle in which the perch bones of the user are arranged. It is moreover preferred that the elastomer body extends completely across a saddle nose of the bicycle saddle and/or across a center region of the bicycle saddle. A combination of these embodiments is preferred, that is, that the elastomer body extends across the seat region, the saddle nose, and the center region. It is preferred that the elastomer body is embodied in one piece.

In the seat region it is preferred that the elastomer body covers a majority of a lower side of the saddle shell, in particular the entire lower side of the saddle shell. The elastomer body covers at least 70% of the lower side of the saddle shell, preferably at least 80%, and particularly preferably at least 90% of the lower side of the saddle shell. Moreover, it is preferred that the elastomer body covers a significant portion, and especially completely covers, the lower side of the saddle shell in the region of the saddle nose, i.e., in the forward region of the bicycle saddle. In particular, the elastomer body covers the lower side of the saddle shell by at least 70%, preferably at least 80%, and particularly preferably at least 90% in the region of the saddle nose. It is correspondingly preferred that the elastomer body is also provided in the center region, i.e., in the region of the bicycle saddle between the seat region and the saddle nose. It is also again preferred that the elastomer body essentially covers, and in particular completely covers, the lower side of the saddle shell in the center region. It is preferred that the lower side of the saddle shell is covered in the center region by in particular at least 70%, preferably at least 80%, and particularly preferably at least 90%.

In another particularly preferred embodiment, the outer contour of the elastomer body essentially corresponds to the outer contour of the bicycle saddle, in particular the saddle shell. Where necessary the dimensions of the elastomer body are somewhat smaller than the outer dimensions of the bicycle saddle or saddle shell. For instance, the outer contour of the bicycle saddle is circumferentially 2 to 3 mm wider than the outer contour of the elastomer body.

In another preferred embodiment, the saddle shell extends completely across a seat region of the bicycle saddle. Because of this the force transmitted by the perch bones onto the saddle may be absorbed particularly well. Such a saddle shell is preferably to be connected to an elastomer body that likewise extends completely across the entire seat region.

In this case the elastomer body preferably covers the entire bicycle saddle. Depending on the material used, it is preferred that the elastomer body has a thickness of 5 to 15 mm, especially 5 to 10 mm. It is particularly preferred that in particular the elastomer body, and particularly preferably its thickness and material, is selected such that lateral edge regions of the seat region may be moved downward by up to 5 mm by the load of the user.

Moreover, it is preferred that the saddle shell extends, in particular extends completely, across the saddle nose and/or the center region of the saddle. With a corresponding design of the elastomer body it is again preferred that the outer contour of the saddle shell corresponds to that of the elastomer body. The saddle shell is in particular embodied in one piece and, in a particularly preferred embodiment, extends across the seat region, the center region, and the region of the saddle nose. In this case it is again preferred that the elastomer body is likewise embodied in one piece and extends across these three regions of the saddle. In a particularly preferred embodiment, an outer contour of the saddle shell corresponds to the outer contour of the elastomer body.

The saddle shell, which in a preferred embodiment is made of harder or more rigid material than the elastomer body, may, like the support element, have regions that are made of a different material and/or have a different thickness. For instance, as for the support element, it is possible to provide rails, thickenings, and the like. In this way the elasticity properties may be varied in different regions and thus the comfort of the bicycle saddle may be varied according to requirements for which the specific saddle model was produced.

In one particularly preferred embodiment of the inventive bicycle saddle, the support element is arranged in the seat region and the saddle shell in particular is provided opposite thereto.

The size of the support element in the seat region is at least 70% of the size of the saddle shell in the seat region, especially at least 80%, and particularly preferred at least 90%. The size is in particular the surface area of the mounted saddle projected onto a horizontal surface.

The support element is preferably also arranged in the region of the saddle nose, in particular opposing the saddle shell. The size of the support element in this region is again preferably 70% of the size of the saddle shell in the region of the saddle nose, in particular at least 80%, and particularly preferably at least 90%.

Moreover, it is particularly preferred that the support element is especially also arranged in the center region of the saddle, i.e. in the region between the saddle nose and the seat region. The size of the support element is again preferably at least 70% of the size of the saddle shell in this region, in particular at least 80%, and particularly preferably at least 90%.

It is particularly preferred that the support element is embodied in a shell shape. The support element has in particular a seat region, a center region, and a region of a saddle nose, wherein these three regions are preferably a single piece so that a single combined support element is provided. The size of the support element is preferably at least 70% of the size of the entire saddle shell, in particular at least 80%, and particularly preferably at least 90%. These size figures shall always be construed to refer to the corresponding projected surface area.

In one preferred embodiment, the support element has a support edge element that faces away from the saddle shell or that is oriented downward when mounted. The edge element is preferably arranged in the seat region and/or in the center region and/or in the region of the saddle nose and/or in the region of the saddle back. It is preferred that the support edge element is arranged symmetrically relative to the longitudinal axis of the bicycle saddle, i.e., opposite thereto. In one particularly preferred embodiment, the edge element is embodied continuous, i.e. in particular without interruptions. The height of the edge element may vary in all of the various embodiments. The edge element is in particular 3 to 5 mm high. Where necessary, the edge element may also have different heights in different regions. In this way it is possible, for example, to influence the rigidity of the support element in a simple manner.

In another preferred embodiment, the saddle shell has a shell edge element. The shell edge element is oriented toward the support element, or downward when the saddle is mounted. The shell edge element may be provided in addition to or instead of a support edge element. The shell edge element is preferably arranged in the seat region and/or in the center region and/or in the region of the saddle nose and/or in the region of the saddle back. It is preferred that the shell edge element is embodied continuous. The height of the shell edge element may vary and in particular may be embodied differently in different regions. The height of the edge element is preferably in the range of 3 to 5 mm. The shell edge element is preferably embodied such that it is symmetrical to the longitudinal axis of the saddle, i.e. shell edge elements that always oppose one another are provided. The height of the shell edge element may vary. The elasticity properties of the saddle shell may be varied because of this. In particular when both a support edge element and a shell edge element are provided, it is preferred that the corresponding regions of the individual edge elements are selected such that edge elements are provided that always mutually oppose one another. For instance, if a support edge element is provided in the seat region, it is preferred that a shell edge element is also provided in the seat region. Moreover, it is preferred that mutually opposing edge elements essentially have the same height.

In another preferred embodiment of the inventive bicycle saddle, a handle element connected to the support edge element and/or the shell edge element is arranged in particular in the center region of the bicycle saddle. The handle element in particular assists in gripping the saddle, for instance for when lifting or carrying the bicycle. The handle element is preferably embodied such that it bridges or covers at least part of a region between the support element and the saddle shell. This prevents the elastomer body from being damaged, especially when carrying or lifting the bicycle from the bicycle saddle. The handle element is preferably arranged only on one of the two edge elements so that the saddle shell is not connected to the support element via the handle element. This might influence the damping properties of the elastomer body. If the saddle shell is connected to the support element via the handle element, the handle element is preferably made of an appropriately elastic material so that in any case there is a limited effect on the elasticity of the elastomer body or on the movability of the saddle shell relative to the support element.

It is particularly preferred that the handle element is connected to a support edge element. If there is no support edge element, it is preferred that the handle element is connected directly to the support element. This provides the opportunity to hold or lift the bicycle by the support element without damaging the elastomer body. Thus no forces act on the elastomer body when the bicycle is being carried. Preferably two handle elements, especially mutually opposing handle elements, are arranged in the center region of the bicycle saddle. In addition, such a handle element may be also provided in the region of the saddle back, for instance. The handle element preferably extends across at least 50% of the center region, in particular across 75% of the center region, i.e. the dimensions of the center region in the longitudinal direction of the saddle.

In another preferred embodiment of the disclosure, the elastomer body has an element that is preferably embodied integrally with the elastomer body. The element extends at least partially between the support edge element and the shell edge element. The height of the element is preferably equal to the height of the edge elements in this region. If only one support edge element or only one shell edge element is provided in this region, the height of the element preferably equals the height of this edge element.

The elastomer body that is arranged between the saddle shell and the support element is preferably securely connected to both elements. The elastomer body covers at least 70% of the lower side of the saddle shell, in particular at least 80%, in particular at least 90%, and particularly preferably at least 100%. It is furthermore preferred that the elastomer body covers at least 70% of a upper side of the support element, in particular at least 80%, and in particular at least 90%, and particularly preferably at least 100%. This produces a good connection between the saddle shell and the support element and realizes good damping properties.

In another particularly preferred embodiment, at least part of elastomer body is visible when the bicycle saddle is viewed from the side. This is possible in a simple manner especially depending on the design of the edge elements. This has the effect that the damping characteristics of the saddle are immediately visible to the user. The dual shell design of the saddle is also easily visible due to the provision of a saddle shell and an opposing support element.

It is moreover preferred that the inventive bicycle saddle is designed such that, when loaded, i.e., during use, the saddle shell is pivotable relative to the support element about a longitudinal axis of the saddle extending in the direction of travel. In particular, the saddle shell is able to pivot relative to the support element by 2° to 10°, and, particularly preferably, by 2° to 5°.

In a particularly preferred refinement of the disclosure, the entire surface area of the elastomer body is connected to the lower side of the saddle shell. It is furthermore preferred that the entire surface area is connected to the support element.

In one preferred refinement of the disclosure, the saddle shell is not embodied flat, but instead has curved regions. In particular on the outside of the saddle it is preferred that the saddle shell has a downwardly oriented edge. This improves the lateral rigidity of the saddle. In such a saddle shell, a space is created under the saddle shell, in particular in the seat region. In one preferred embodiment, at least part of the elastomer body is arranged in this space.

The disclosure furthermore relates to a method for producing a bicycle saddle, in particular a bicycle saddle as described in the foregoing. The bicycle saddle is produced in that the saddle shell and the support element are placed into a mold, in particular into an injection die. They are placed such that there is a space between the saddle shell and the support element, wherein the two elements are arranged opposing one another such that a upper side of the support element opposes the lower side of the saddle shell. It is preferably obvious that the components are embodied symmetrical to a longitudinal axis of the saddle and are correspondingly arranged symmetrically. According to the disclosure, the material of the elastomer body is then added or injected between the saddle shell and the support element. For this, there is immediate joining of the material of the elastomer body to the lower side of the saddle shell and to the upper side of the support element.

Then, or if necessary in the same production step, the saddle cushion may also be applied or sprayed on.

BRIEF DESCRIPTION OF THE DRAWINGS

The disclosure shall be described in greater detail in the following using a preferred embodiment, making reference to the attached drawings.

DETAILED DESCRIPTION OF THE PREFERRED EMBODIMENT

In a top view, a bicycle saddle has a seat region 10 to which a center region 12 is attached. The center region 12 transitions into the saddle nose 14. The saddle nose 14 is embodied narrow and the seat region 12 is embodied wide, so that the majority of the rider's weight is absorbed in the seat region, especially via the rider's perch bones. The bicycle saddle is embodied symmetrical to a center axis 16 that runs longitudinally.

Figure 2:
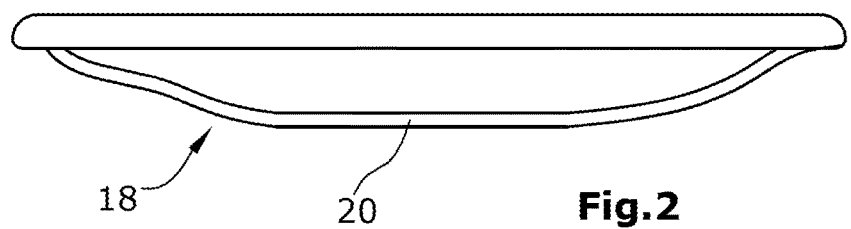
FIG. 2 is a schematic side view of the bicycle saddle depicted in FIG. 1.

A lower side of the bicycle saddle is connected to a saddle frame 18 (FIG. 2). The depicted embodiment of the saddle frame 18 has in particular two rails extending essentially to the left of the saddle. In a center region 20 of the two rails of the saddle frame 18 the latter may be connected to the saddle post via an attaching element.

Figure 3:
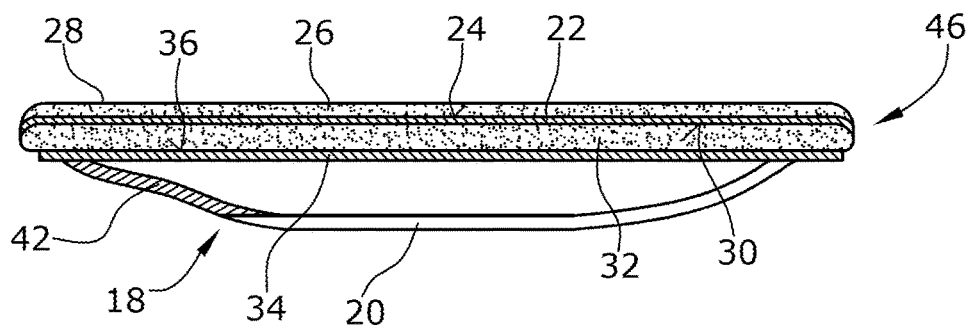
FIG. 3 is a schematic section along the line III-III in FIG. 1.

The inventive bicycle saddle has a saddle shell 22 (FIG. 3) produced from a relatively rigid material. Arranged on an upper side 24 of the saddle shell 22 is a saddle cushion 26. The latter may be covered by a cover layer 28, as in the depicted exemplary embodiment.

An elastomer body 32 is arranged on a lower side 30 of the saddle shell 22. In the exemplary embodiment depicted, the elastomer body 32 extends across the entire lower side 30 of the saddle shell 32 and is connected thereto in particular across its entire surface area.

Figure 4:
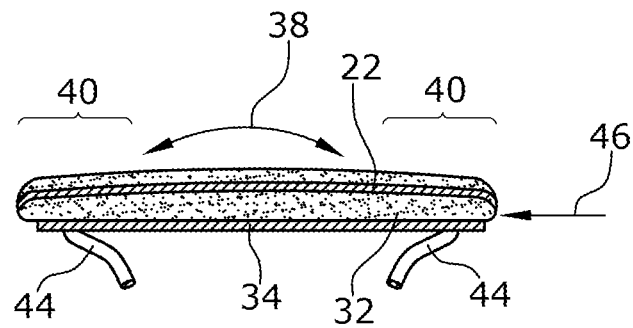
FIG. 4 is a schematic section along the line IV-IV in FIG. 1.

Provided opposing the saddle shell 22 is a support element 34. The elastomer body 32 is thus arranged between the saddle shell 22 and the support element 34. The upper side 36 of the support element 34 and the elastomer body 32 are preferably also connected across the entire surface 36. Since the saddle shell 22 is preferably not connected to the support element 34, or is preferably connected thereto only in the region of the saddle nose 14, the saddle shell 22 is decoupled from the support element 34. Because of this, in a particularly preferred embodiment it is possible for the saddle shell 22 to be tilted, in particular in the seat region 10, as indicated by the arrow 38 (FIG. 4). Thus, given a corresponding load, the saddle shell may give by up to 5 mm, for instance, in the outer regions 40 of the seat region. This partially compensates a tilting movement of the pelvis while riding or the saddle makes the tilting movement of the pelvis.

Figure 1:
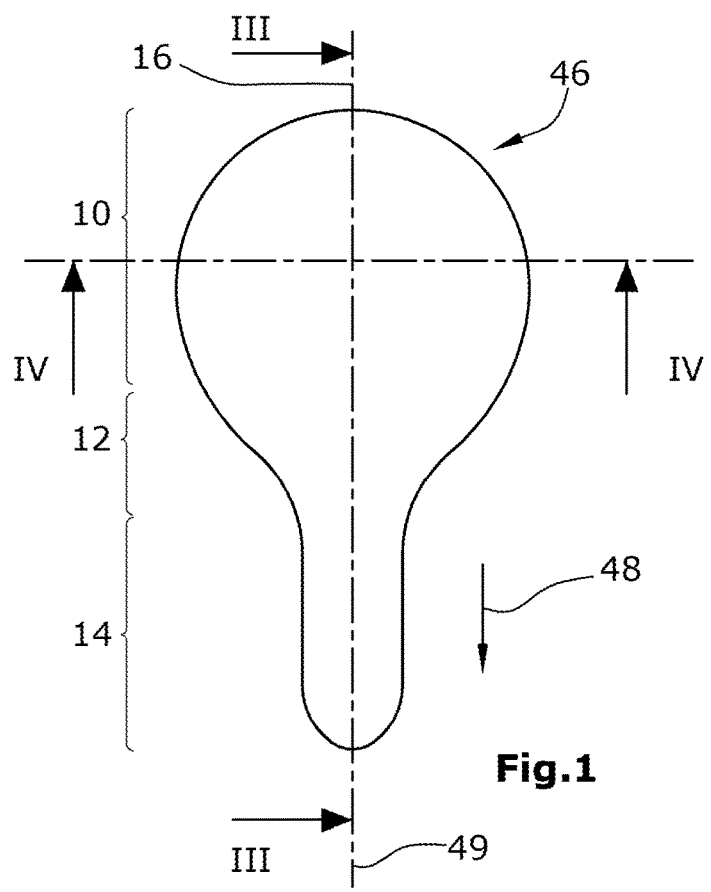
FIG. 1 is a schematic top view of a bicycle saddle.

The saddle frame 18 is connected to the support element 34 in the region of the saddle nose 14 via a forward connecting element 42. The saddle frame 18 is furthermore [ . . . ] via two rear connecting parts 44 to a saddle back 46 that is connected in particular to the seat region in opposition to a direction of travel 48 (FIG. 1).

In the embodiment depicted in FIG. 4, the outer edge region 40 of the saddle shell 22 is also arranged opposing the support element 34 at a distance. Because of this, the elastomer body 32 is visible to the user in a side view (arrow 46).

In a first alternative embodiment (FIG. 5), the support element has a preferably continuous support edge element 48. In the depicted embodiment, the saddle shell 22 also has an in particular continuous shell edge element 50. When mounted, both edge elements 48, 58 face downward (arrow 52). In the exemplary embodiment depicted, an element 54 of the elastomer body 32 is arranged between the two edge elements 48, 50. Similarly only one of the two edge elements 48, 50 may be provided. In particular, only parts may be provided with edge elements in the longitudinal direction. In particular, if the edge element 50 is not provided or at least is not provided in some regions, the elastomer body 32, in particular the element 54 of the elastomer body 32, is easily visible to the user in a side view (arrow 46).

Figure 5:
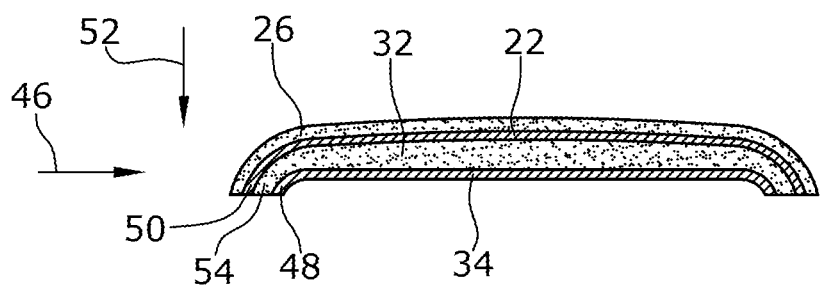
FIG. 5 is a schematic section of an alternative embodiment along the line IV-IV in FIG. 1; and, FIG. 6 is a schematic section of another alternative embodiment along the line IV-IV in FIG. 1.
Figure 6:
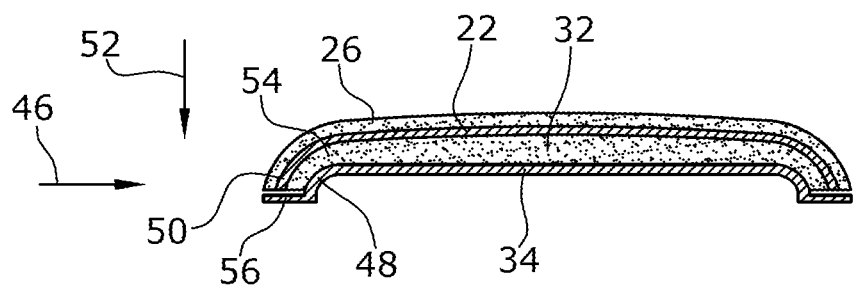

In another alternative embodiment of the disclosure (FIG. 6), edge regions 48, 50 corresponding to the embodiment depicted in FIG. 5 are provided, wherein these are not necessarily continuous. In addition, in the exemplary embodiment depicted a handle element 56 is embodied with the edge region 48 of the support element 34, in particular is embodied integrally with the edge element 48 and the support element 34. The handle element 46 runs essentially horizontally and covers the element 54 of the elastomer body 32. This permits the saddle to be grasped easily, for example for carrying the bicycle, wherein it is assured that the elastomer body is not loaded and is certainly not damaged by this.

The handle element 56 is preferably provided in the center region 12 and in a particularly preferred embodiment projects into the seat region 10. The handle element 56 may in particular also be embodied continuous.

What is claimed is:

1. A bicycle saddle having
   a saddle shell,
   a seat cushion connected to an upper side of the saddle shell,
   a support element that is connected to a saddle frame for connecting to a seat post, and
   an elastomer body arranged between the support element and the saddle shell, wherein the elastomer body is less rigid than each of the saddle shell and the support element, and
   wherein the saddle shell comprises a flange downturned along a periphery of the saddle shell, the elastomer body comprises a flange downturned along a periphery of the elastomer body, the support element comprises a flange downturned along a periphery of the support element such that the flange of the elastomer body is sandwiched by the flanges of the saddle body and the support element, and the saddle shell is supported on the support element solely by the elastomer body.

2. The bicycle saddle according to claim 1, wherein the elastomer body is elastically deformable so that a relative movement between support element and saddle shell is permitted.

3. The bicycle saddle according to claim 1, wherein the support element and/or the saddle shell are produced from more rigid material than the elastomer body.

4. The bicycle saddle according to claim 1, wherein the elastomer body has thermoplastic polyurethane or is embodied from thermoplastic polyurethane.

5. The bicycle saddle according to claim 1, wherein the elastomer body has ethylene vinyl acetate or is embodied from ethylene vinyl acetate.

6. The bicycle saddle according to claim 1, wherein a forward connecting element of the saddle frame is connected to the support element in a region of a saddle nose.

7. The bicycle saddle according to claim 1, wherein a rear connecting element of the saddle frame is connected to the support element in a region of a saddle back.

8. The bicycle saddle according to claim 1, wherein the support element is arranged in a seat region.

9. The bicycle saddle according to claim 8, wherein the size of the support element in the seat region is at least 70% of the size of the saddle shell.

10. The bicycle saddle according to claim 1, wherein the support element is arranged in a region of a saddle nose.

11. The bicycle saddle according to claim 10, wherein the size of the support element in the region of the saddle nose is at least 70% of the size of the saddle shell.

12. The bicycle saddle according to claim 1, wherein the support element is arranged in a center region between a seat region and a region of a saddle nose.

13. The bicycle saddle according to claim 1, wherein the size of the support element in the center region is at least 70% of the size of the saddle shell.

14. The bicycle saddle according to claim 1, wherein the support element extends from a region of a saddle nose to a region of a saddle back.

15. The bicycle saddle according to claim 1, wherein the support element is embodied in a single piece.

16. The bicycle saddle according to claim 1, wherein the elastomer body extends completely across a seat region of the bicycle saddle.

17. The bicycle saddle according to claim 1, wherein the elastomer body extends across a region of a saddle nose of the bicycle saddle.

18. The bicycle saddle according to claim 1, wherein the elastomer body extends completely across a center region of the bicycle saddle.

19. The bicycle saddle according to claim 1, wherein an outer contour of the elastomer body corresponds in shape to an outer contour of the bicycle saddle.

20. The bicycle saddle according to claim 1, wherein the saddle shell extends completely across a seat region of the bicycle saddle.

21. The bicycle saddle according to claim 1, wherein the saddle shell extends completely across a region of a saddle nose of the bicycle saddle.

22. The bicycle saddle according to claim 1, wherein the saddle shell extends completely across a center region of the bicycle saddle.

23. The bicycle saddle according to claim 1, wherein an outer contour of the saddle shell corresponds in shape to an outer contour of the bicycle saddle.

24. The bicycle saddle according to claim 1, wherein an entire upper surface area of elastomer body is connected to the saddle shell.

25. The bicycle saddle according to claim 1, wherein the flange of the support element is provided in at least one of a seat region or a in a center region or a region of a saddle nose.

26. The bicycle saddle according to claim 1, wherein the flange of the support element is continuous along an entire periphery of the support element.

27. The bicycle saddle according to claim 1, wherein the flange of the saddle shell is arranged in at least one of a seat region or in the center region or in a region of a saddle nose.

28. The bicycle saddle according to claim 1, wherein the flange of the saddle shell is continuous along an entire periphery of the saddle shell.

29. The bicycle saddle according to claim 1, wherein a handle element is connected to the flange of the support element or the flange of the saddle shell.

30. The bicycle saddle according to claim 29, wherein the handle element extends across at least 50% of a center region of the flange of the support element or the flange of the saddle shell.

31. The bicycle saddle according to claim 29, wherein the handle element bridges an interval between the saddle shell and the support element.

32. The bicycle saddle according to claim 1, wherein the elastomer body covers at least 70% of a lower side of the saddle shell.

33. The bicycle saddle according to claim 1, wherein the elastomer body covers at least 70% of an upper side of the support element.

34. The bicycle saddle according to claim 1, wherein when loaded the saddle shell is able to pivot relative to the support element by an angle of 2° to 10° about a longitudinal axis extending in the longitudinal direction.

35. A method for producing a bicycle saddle according to claim 1, in which the saddle shell and the support element are arranged at an interval to one another in a mold, and the material of the elastomer body is added between the saddle shell and the support element.

36. The method for producing a bicycle saddle according to claim 35, wherein the saddle cushion is applied to an upper side of the saddle shell in the mold.

\* \* \* \* \*